US010338571B2

(12) United States Patent
Becerra et al.

(10) Patent No.: US 10,338,571 B2
(45) Date of Patent: Jul. 2, 2019

(54) MOTOR CONTROLLER AND METHODS OF WIRELESSLY REPROGRAMMING MOTOR CONTROLLER

(71) Applicant: Regal Beloit America, Inc., Beloit, WI (US)

(72) Inventors: Roger Carlos Becerra, Fort Wayne, IN (US); Ming Li, Fort Wayne, IN (US); Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/816,569

(22) Filed: Nov. 17, 2017

(65) Prior Publication Data
US 2019/0155255 A1    May 23, 2019

(51) Int. Cl.
| G05D 1/02 | (2006.01) |
| H04Q 9/00 | (2006.01) |
| G05B 19/4155 | (2006.01) |
| H02P 23/00 | (2016.01) |
| H02P 5/74 | (2006.01) |
| H02J 50/10 | (2016.01) |
| H04L 29/08 | (2006.01) |
| H04W 84/12 | (2009.01) |

(52) U.S. Cl.
CPC .......... *G05B 19/4155* (2013.01); *H02J 50/10* (2016.02); *H02P 5/74* (2013.01); *H02P 23/0077* (2013.01); *G05B 2219/33192* (2013.01); *H04L 67/125* (2013.01); *H04W 84/12* (2013.01)

(58) Field of Classification Search
CPC .................................................. G05B 19/4155
USPC ........................................................... 318/16
See application file for complete search history.

(56) References Cited

U.S. PATENT DOCUMENTS

| 5,491,831 A | 2/1996 | Williams et al. |
| 6,984,950 B2 | 1/2006 | Jonsson et al. |
| 7,671,555 B2 | 3/2010 | Mullin |
| 9,491,242 B2* | 11/2016 | Bomkamp ............. H04L 67/12 |
| 9,794,347 B2 | 10/2017 | Bomkamp et al. |
| 2005/0038527 A1 | 2/2005 | Kulkarni et al. |
| 2013/0109323 A1* | 5/2013 | Ruutu .................. H04B 5/0031 |
| | | 455/68 |
| 2013/0120107 A1 | 5/2013 | Song et al. |
| 2013/0326495 A1* | 12/2013 | Reunamaki ............... G06F 8/65 |
| | | 717/173 |
| 2014/0079564 A1 | 3/2014 | Becerra et al. |
| 2015/0019024 A1* | 1/2015 | Sabripour .......... G05D 23/1927 |
| | | 700/276 |

(Continued)

*Primary Examiner* — Erick D Glass
(74) *Attorney, Agent, or Firm* — Armstrong Teasdale LLP

(57) ABSTRACT

A motor controller for controlling an electric motor includes a motion control microcontroller unit (MCU) for storing initial control parameters for the electric motor, and a wireless receiver communicatively coupled to the motion control MCU. The wireless receiver is configured to activate in response to initiation of a wireless connection with a remote device, receive a wireless control signal from the remote device, the wireless control signal including updated control parameters, and transmit the updated control parameters to the motion control MCU. The motor controller also includes an energy management system configured to power the wireless receiver and the motion control MCU.

20 Claims, 10 Drawing Sheets

(56) References Cited

U.S. PATENT DOCUMENTS

2016/0223999 A1   8/2016   Song et al.

\* cited by examiner

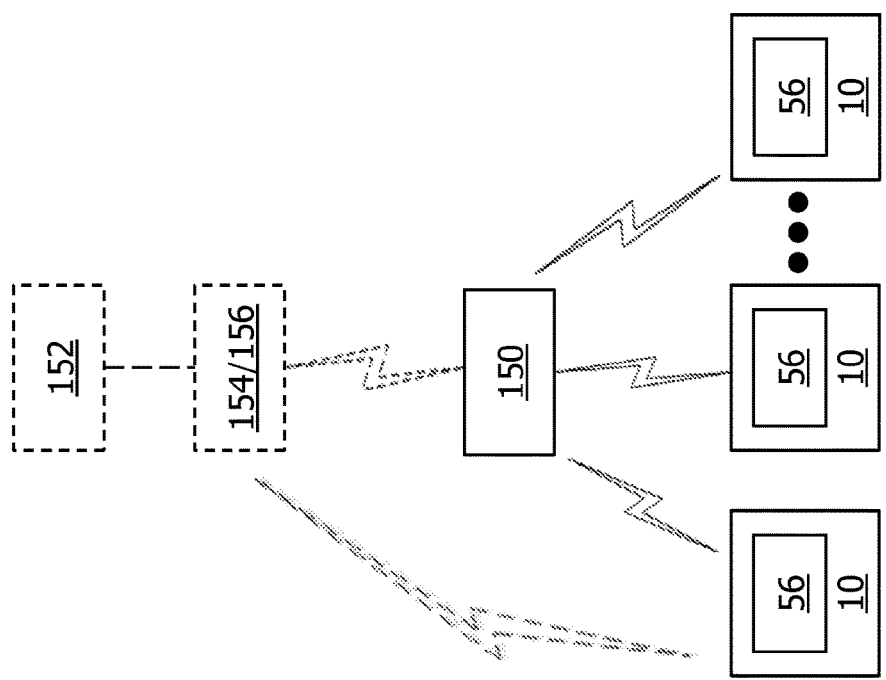

MOTOR CONTROLLER AND METHODS OF WIRELESSLY REPROGRAMMING MOTOR CONTROLLER

BACKGROUND

The field of the disclosure relates generally to a controller for an electric motor and, more specifically, a motor controller and methods of wirelessly reprogramming the motor controller without connecting the motor controller to an external power source.

It is not uncommon for a motor, such as a motor used in various residential applications, to be produced and to be stored for a period of time before that motor is installed and used "in the field." For instance, the motor may be stored in a production factory, a storage area, various transportation vehicles or location, and/or in OEM warehouses. During this period of time between production and installation, it may be desirable or necessary to update firmware or software of the motor to ensure proper functionality of the motor once it is installed. Typically, a technician must retrieve each individual motor needing an update, connect the motor to a power source, and physically connect the motor to another device including the updates (e.g., in a wired connection), such that the motor can download and implement the updates. This process can be time-consuming and also increases the risk that the motor may be damaged or otherwise mishandled during these updates.

BRIEF DESCRIPTION

In one aspect, a motor controller for controlling an electric motor is provided. The motor controller includes a motion control microcontroller unit (MCU) for storing initial control parameters for the electric motor, and a wireless receiver communicatively coupled to the motion control MCU. The wireless receiver is configured to activate in response to initiation of a wireless connection with a remote device, receive a wireless control signal from the remote device, the wireless control signal including updated control parameters, and transmit the updated control parameters to the motion control MCU. The motor controller also includes an energy management system configured to power the wireless receiver and the motion control MCU.

In another aspect, a system for updating control parameters of electric motors is provided. The system includes a programming device configured to initiate a wireless connection with an electric motor, and transmit a wireless control signal to the electric motor, the wireless control signal including updated control parameters for control of the electric motor. The system also includes the electric motor, including a motor controller for controlling the electric motor. The motor controller includes a motion control microcontroller unit (MCU) for storing initial control parameters for the electric motor, and a wireless receiver communicatively coupled to the motion control MCU. The wireless receiver is configured to activate in response to the initiation of the wireless connection with the programming device, receive the wireless control signal from the programming device, and transmit the updated control parameters to the motion control MCU. The motor controller also includes an energy management system configured to power the wireless receiver and the motion control MCU.

In yet another aspect, a method of wirelessly updating control parameters of electric motors is provided. The method includes initiating, by a programming device, a wireless connection with an electric motor, and, in response to the initiating, activating a wireless receiver of the electric motor. The method also includes transmitting, by the programming device, a wireless control signal to the electric motor, the wireless control signal including updated control parameters for control of the electric motor. The method further includes receiving, at the wireless receiver, the wireless control signal, transmitting, by the wireless receiver, the updated control parameters to a motion control microcontroller unit (MCU) of the electric motor, and implementing, by the motion control MCU, one or more updates associated with control of the wireless receiver based upon the updated control parameters.

BRIEF DESCRIPTION OF THE DRAWINGS

FIG. 6 is a schematic diagram of an exemplary method of wirelessly reprogramming a plurality of motor controllers;

DETAILED DESCRIPTION

Embodiments of a motor controller and methods of programming the motor controller described herein enable wireless and/or remote programming of the motor controller by one or more remote devices. Moreover, the motor controller includes an energy management system to power one or more components to implement programming updates before the motor is installed or connected to a utility power supply. In addition, the methods described herein enable simultaneous and parallel programming of a plurality of motors by a single remote programming device.

Figure 1:
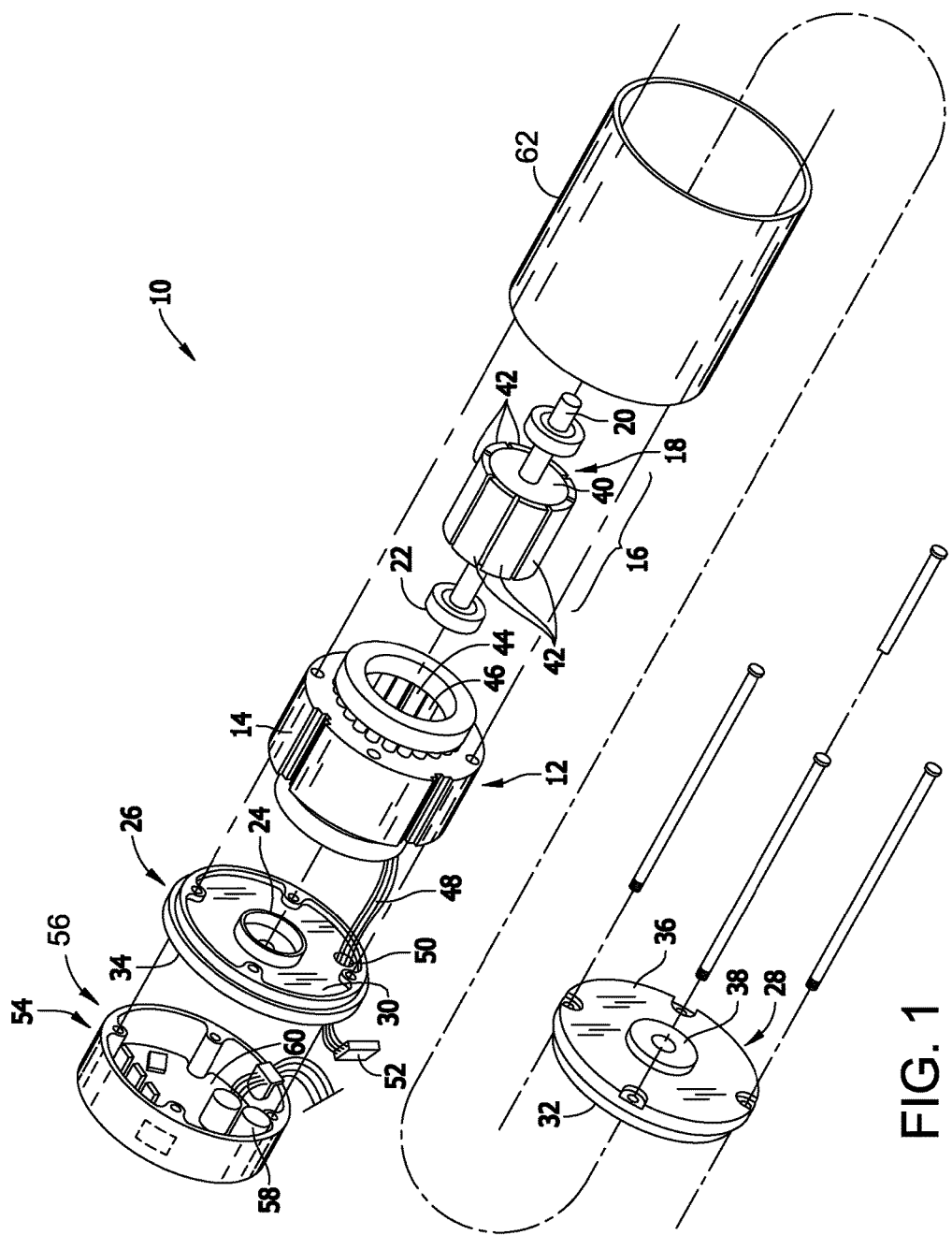
FIG. 1 is an exploded view of an exemplary motor.

FIG. 1 is an exploded view of an exemplary motor 10. Motor 10 includes a stationary assembly 12 including a stator or core 14 and a rotatable assembly 16 including a permanent magnet rotor 18 and a shaft 20. In the exemplary embodiment, motor 10 is utilized as a fan and/or blower motor in a fluid (e.g., water, air, etc.) moving system. For example, motor 10 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, motor 10 may be implemented in any application that enables motor 10 to function as described herein. Motor 10 may also be used to drive mechanical components other than a fan and/or blower, including mixers, gears, conveyors, and/or treadmills.

Rotor 18 is mounted on and coupled to shaft 20 for rotation within conventional bearings 22. Bearings 22 are mounted in bearing supports 24 integral with a first end member 26 and a second end member 28. First end member 26 has an inner facing side 30, and second end member 28 has an inner facing side 32. In addition, first end member 26 has an outer side 34, and second end member 28 has an outer side 36. Outer sides 34 and 36 are opposite inner sides 30 and 32 respectively. Stationary assembly 12 and rotatable assembly 16 are located between sides 30 and 32. Additionally, second end member 28 includes an aperture 38 for shaft 20 to extend through outer side 36.

Rotor 18 comprises a ferromagnetic core 40 and is rotatable within stator 14. Rotor core 40 includes a plurality of segments 42 of permanent magnet material, each providing a relatively constant flux field. Segments 42 are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number and construction, and flux fields may be utilized with such other rotors within the scope of the invention.

Stationary assembly 12 includes a plurality of windings 44 adapted to be electrically energized by a power source (e.g., utility power) to generate an electromagnetic field, and stator core 14 includes a plurality of teeth 46. Windings 44 are coils of wire wound around teeth 46. Windings 44 terminate in winding terminal leads 48, which are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention. Motor 10, in some embodiments, includes any even number of rotor poles and any number of stator poles.

Motor 10 further includes an enclosure 54 which mounts on the rear portion of motor 10. A motor controller 56 includes a plurality of electronic components 58 and a connector (not shown) mounted on a component board 60, such as a printed circuit board. Motor controller 56 is connected to winding stages 44 by interconnecting connector 52. Motor controller 56 applies a current to one or more of winding stages 44 at a time for commutating windings 44 in a preselected sequence to rotate rotatable assembly 16 about an axis of rotation.

A housing 62 is positioned between first end member 26 and second end member 28 to facilitate enclosing and protecting stationary assembly 12 and rotatable assembly 16.

Figure 2:
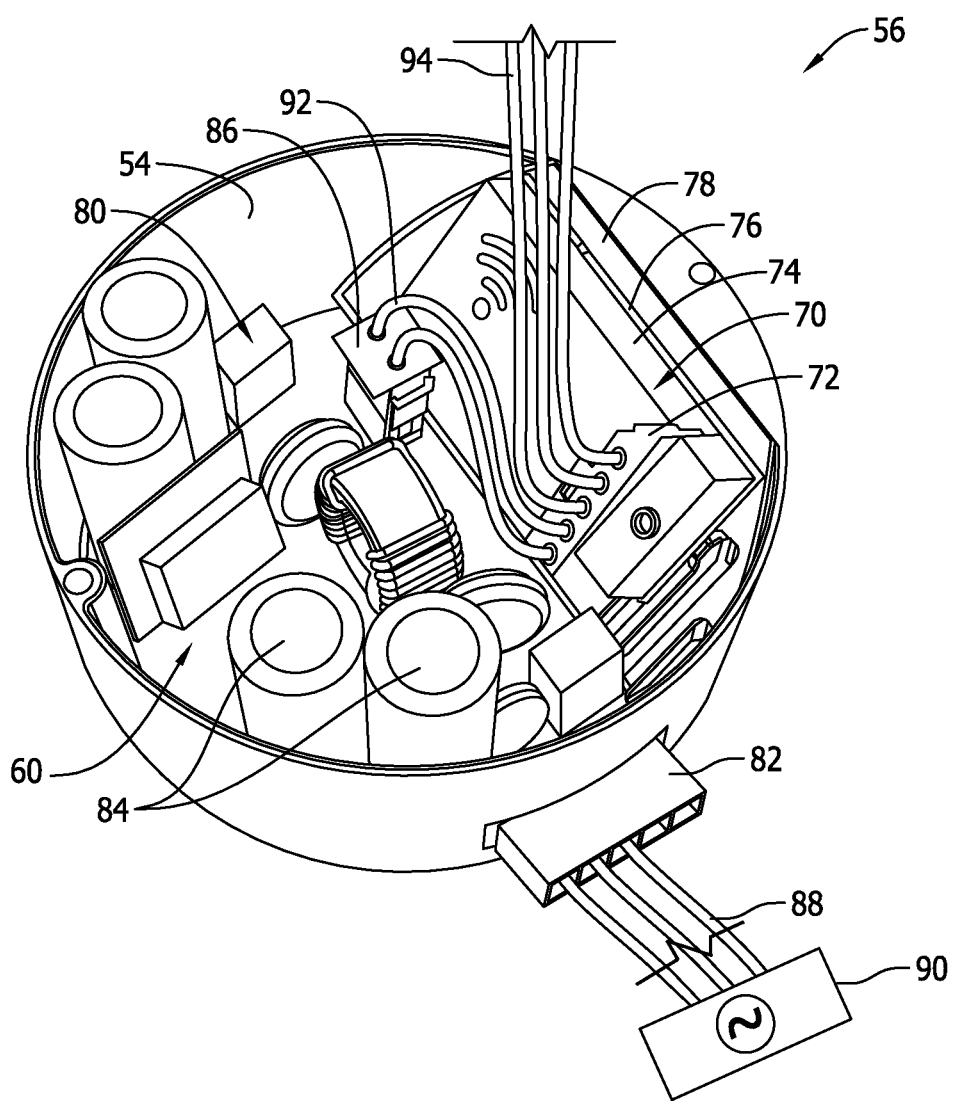
FIG. 2 is a perspective view of an exemplary motor controller for controlling the motor shown in FIG. 1.
Figure 3:
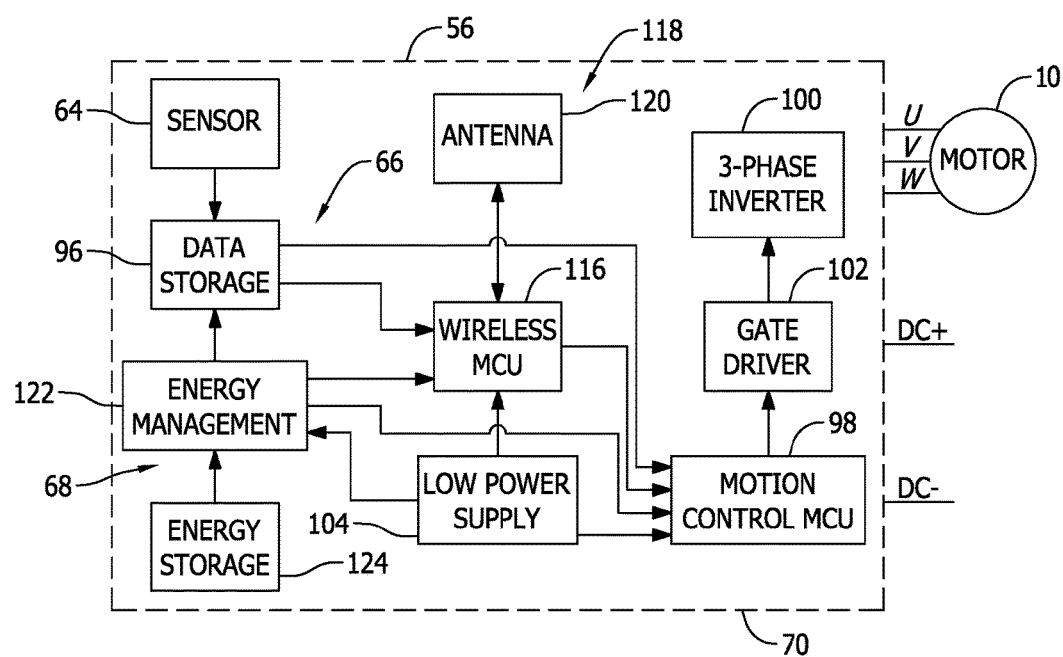
FIG. 3 is a schematic diagram of an exemplary motor controller, such as the motor controller shown in FIG. 2.
Figure 4:
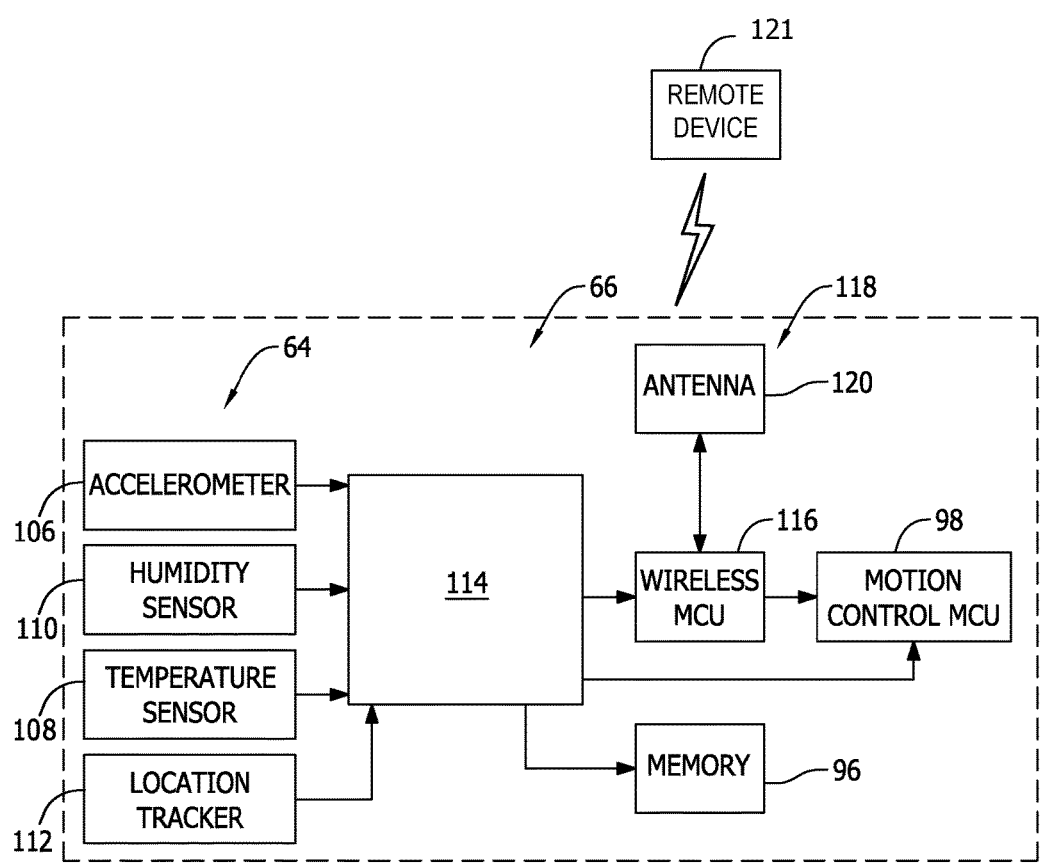
FIG. 4 is a schematic diagram of exemplary sensors and a data management system of the motor controller shown in FIG. 2.

FIG. 2 is a perspective view of motor controller 56, and FIG. 3 is a block diagram of motor controller 56. As described further herein, motor controller 56 includes a plurality of integrated sensors 64, a data management system 66, and an energy management system 68. FIG. 4 is a block diagram of sensors 64 and data management system 66. FIG. 5 is a block diagram of a first exemplary embodiment of energy management system 68, and FIG. 6 is a block diagram of a second exemplary embodiment of energy management system 68.

With reference to FIG. 2, in the exemplary embodiment, motor controller 56 includes a motor management module 70 disposed within enclosure 54. Motor management module 70 includes an input/output connector 72 and electrical components (shown and described with respect to FIGS. 3-6). Motor management module 70 houses the components within an encapsulated, heat-sharing package 74 that provides protection from damage and/or failure due to moisture entering enclosure 54. In some embodiments, heat-sharing package 74 includes an insulated metal substrate 76 coupled to a metal heatsink 78. For example, heat-sharing package 74 may include an insulated metal substrate (IMS) or a thick printed copper (TPC) based packaging to integrate high power semiconductor devices and all moisture-sensitive components such as integrated circuits and surface mount resistors.

Motor controller 56 further includes a power supply module 80 that, in the illustrated embodiment, is physically separate from, but in electrical connection with, motor management module 70. Power supply module 80 includes an input connector 82, a plurality of electrical components 84, and an output connector 86 mounted on component board 60. In the exemplary embodiment, input connector 82 includes power input line connectors 88 for coupling to a power source 90. Power source 90 (e.g., a utility power source) is configured to transmit AC power such as, but not limited to, high and/or low voltages. Input connector 82 interfaces with and receives AC input power from power source 90. In some embodiments, power is supplied via a system controller (not shown), such as an HVAC system controller. When motor 10 is installed and/or in use, motor 10 is configured to run on AC power supplied from power source 90. More particularly, electrical components 84 of power supply module 80 are configured to convert input AC voltage received from power source 90 to a desired level of direct current (DC) voltage. Using output connector 86, power supply module 80 outputs the converted DC voltage to motor management module 70. Output connector 86 includes two high-voltage wires 92 for providing the converted DC voltage to motor management module 70.

Input/output connector 72 is coupled to high-voltage wires 92 for receiving the converted DC voltage from power supply module 80. Motor management module 70 converts the DC voltage to a three-phase alternating current (AC) voltage for driving electric motor 10 based on instructions received from an external device, for example, an HVAC system controller. Input/output connector 72 outputs the three-phase AC voltage to winding stages 44 (shown in FIG. 1) of motor 10 via output power wires 94.

With reference now to FIG. 3, motor controller 56 includes (and motor management module 70 houses) at least one integrated sensor 64, at least one memory device 96, energy management system 68, and data management system 66. In addition, motor management module 70 may further house additional motor control components, such as motion control microcontroller unit (MCU) 98, an inverter power stage 100, a gate driver 102 that drives inverter power stage 100, and a low power supply 104. Motion control MCU 98 stores initial control parameters associated with control operations of motor 10 implemented by motion control MCU 98. Inverter power stage 100 may include an insulated-gate bipolar transistor (IGBT) and/or diode-based three-phase half bridge topology. Low-power supply 104 may provide 15V and 3.3V for low-power circuits. A wireless MCU 116 and antenna 120 (described further herein) are operatively coupled and configured to conduct data processing and communication. Motor controller 56 may include additional typical components, such as a processor, associated with control of motor 10.

With reference to FIG. 4, sensors 64 include one or more of an accelerometer 106, a temperature sensor 108, a humidity sensor 110, and a location tracker 112, generally and collectively referred to as sensors 64. One or more of these sensors 64 may be combined, such as a temperature sensor 108 embedded in an accelerometer 106. In the exemplary embodiment, sensors 64 are disposed on motor 10, and, more particularly, are integrated within motor management module 70. Sensors 64 are configured to monitor a status of motor 10 during a period of time before motor 10 is installed and in use in the field, as described further herein. Sensors 64 are further configured to collect sensor data associated with and descriptive of the status of motor 10 during this period of time. Sensors 64 may be further configured to collect sensor data after motor 10 is installed or commissioned for in-field use.

Although sensors 64 are illustrated and described as being housed within motor management module 70, it should be readily understood that one or more sensors 64 may be disposed on motor 10 in a location other than within motor management module 70, and may be in wired or wireless connection with data management system 66 from that location. Moreover, it should be readily understood that motor controller 56 may include any combination of sensors 64 and/or any number of sensors 64, other than that illustrated in FIG. 4, without departing from the scope of the present disclosure.

Data management system 66 facilitates communicating sensor data collected from sensors 64 to other components. Specifically, data management system 66 facilitates communication of sensor data to memory device 96 and/or to remote devices (not shown), such as a diagnostic device and/or a mobile computing device (e.g., operated by a service technician or user of motor 10). In one exemplary embodiment, with further reference to FIG. 4, data management system 66 includes a data interface component 114. Data interface component 114 may include a signal bus, such as a direct $I^2C$ bus, connecting sensors 64 to memory device 96 and/or to wireless MCU 116.

In addition, data management system 66 includes at least one transmitting and/or receiving component. More particularly, data management system 66 includes wireless communication component 118 that facilitates receiving wireless signals and/or transmitting wireless signals. Wireless communication component 118 enables wireless communication between a remote device 121 (e.g., a remote device 121 of a manufacturer of motor 10, an HVAC system manufacturer using motor 10, a technician of motor 10, and/or a customer owning motor 10) and motor controller 56. Wireless signals may include, but are not limited to, Bluetooth®, Bluetooth® low energy, near field communications (NFC), ZigBee®, Wi-Fi, Z-Wave, RFID, infrared, and/or any other known types of wireless signals. It should be readily understood that wireless communication component 118 and wireless MCU 116 may be a single component or separate components communicatively coupled. Accordingly, where reference is made to receiving, transmitting, and/or processing wireless signals, either or both of wireless MCU 116 and wireless communication component 118 may be involved in such processes. Remote device 121 may include any device capable of wireless communication, including, but not limited to, a cell phone or "smart" phone, a tablet, a laptop computing device, a desktop computing device, a server computing device, or a dedicated tool specifically configured for wireless communication with motor controller 56. In some embodiments, remote device 121 includes software (e.g., an "app") that facilitates a user initiating and controlling the wireless communication between remote device 121 and motor controller 56.

Transmitted wireless signals may include, as described herein, sensor data transmitted from motor controller 56 to remote device 121. Received wireless signals may include interrogation signals transmitted from remote device 121 to motor controller 56, activating motor controller 56 to transmit stored sensor data. Received wireless signals may additionally or alternatively include wireless control signals transmitted from remote device 121 to motor controller 56, the wireless control signals including updated control parameters. The updated control parameters cause motion control MCU 98 to implement one or more updates to programmed controls of motor 10. The wireless control signals may include interrogation and/or activation signals, such that receipt thereof causes activation of one or more components of motor controller 56. For example, receiving the wireless control signal may cause activation of energy management system 68, wireless MCU 116, wireless communication component 118, and/or motion control MCU 98.

In some embodiments, wireless communication component 118 includes an antenna 120, such as a three-dimensional (3D) antenna or a ceramic antenna. In other embodiments, other suitable types of antennas 120 may be used. Alternatively, wireless communication component 118 may include other transmitter, receiver, and/or transceiver element(s).

In one exemplary embodiment, remote device 121 (which may include a programming device, as described further herein) initiates a wireless connection with motor controller 56. More particularly, remote device 121 initiates the wireless connection with wireless communication component 118 and/or wireless MCU 116. As described herein, a wireless connection may be initiated with wireless communication component 118 and/or wireless MCU 116 while wireless communication component 118 and/or wireless MCU 116 are in a "sleep" or passive energy mode. For instance, in the passive energy mode, wireless communication component 118 and/or wireless MCU 116 may receive a minimal amount of power from energy management system 68 such that component(s) is able to receive an interrogation or initiation signal from remote device 121 with a low advertising rate or long connection interval such as 1 second (s). As described further herein, receipt of the interrogation or initial signal causes energy management system 68 to power wireless communication component 118 and/or wireless MCU 116 in a "powered" or active mode, thereby activating wireless communication component 118 and/or wireless MCU 116 to receive data communications over the wireless connection with a high advertising rate or low connection interval such as 10 ms.

Remote device 121 transmits a wireless control signal including updated control parameters to wireless communication component 118 and/or wireless MCU 116. Wireless MCU 116 may be configured to process the updated control parameters and "self-implement" any control updates directed to wireless MCU 116 identified in the updated control parameters. Wireless MCU 116 transmits the updated control parameters to motion control MCU 98. Motion control MCU 98 processes the updated control parameters and implements one or more control updates based upon the updated control parameters. Implementing the updates may include storing the updated control parameters (e.g., instead of the initial control parameters or in addition to the initial control parameters), performing software updates, and/or performing firmware updates.

Figure 5C:
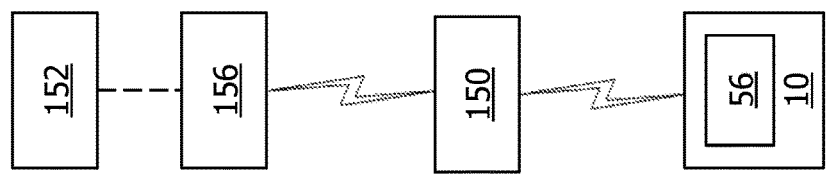
FIGS. 5A-5C are schematic diagrams of exemplary methods of wirelessly reprogramming a motor controller.
Figure 5B:
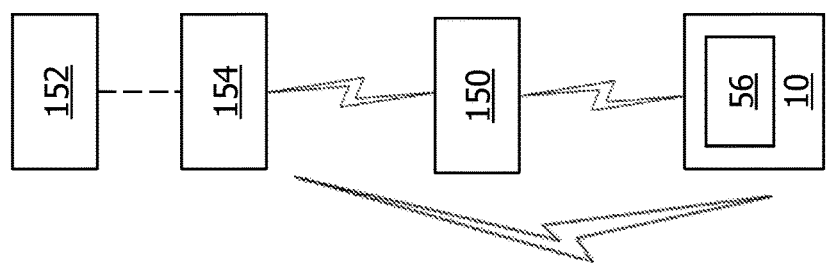
Figure 5A:
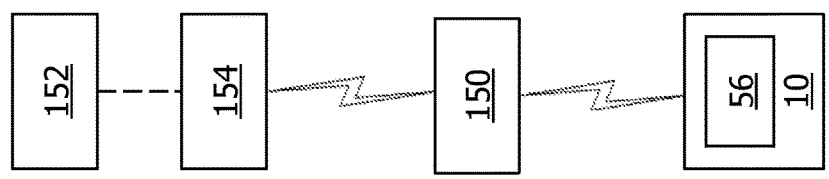

With reference to FIGS. 5A-5C, exemplary methods for wirelessly reprogramming motor 10 using one or more remote devices 121 are illustrated. More particularly, remote device 121 includes a programming device 150 that communicates wirelessly with motor controller 56 of motor 10. In FIG. 5A, programming device 150 wirelessly receives updated control parameters from another remote device 121 including a source device 152. More specifically, programming device 150 receives the updated control parameters from source device 152 over a Wi-Fi connection (e.g., via a Wi-Fi router and modem 154) with source device 152. Source device 152 may include any kind of remote device 121 capable of wireless communication, such as any cloud computing device. Although the wireless connection between programming device 150 and source device 152 is described as a Wi-Fi connection, any other suitable wireless connection may be implemented without departing from the scope of the present disclosure.

In one embodiment, programming device 150 downloads the updated control parameters over the wireless connection with source device 152. The updated control parameters may include firmware changes or updates, software changes or updates, or any other changes or updates that may be implemented at motor controller 56. Although programming device 150 is described as receiving the updated control parameters from source device 152, in any alternative embodiment, programming device 150 may store or include built-in firmware or other control parameters that may be transmitted directly to motor controller 56. In the exemplary embodiment, programming device 150 initiates a wireless connection with motor controller 56 and transmits a wireless control signal including the updated control parameters to motor controller 56. In some embodiments, programming device 150 automatically initiates this update process. For example, programming device 150 may automatically initiate the update process (i) after programming device 150 receives updated control parameters from source device 152, (ii) when programming device 150 enters a threshold distance from motor controller 56, (iii) periodically or according to a particular schedule, and/or (iv) under any other conditions. Alternatively or additionally, programming device 150 may initiate the update process upon command from a user of programming device 150 and/or source device 152.

In some embodiments of the programming methods illustrated in FIGS. 5A-5C, programming device 150 may be positioned within a threshold distance of motor controller 56 to initiate the wireless connection with motor controller 56. The threshold distance may be associated with the particular type of wireless communication initiated and/or hardware limitations of programming device 150, motor controller 56, source device 152, and/or Wi-Fi router and modem 154. In some embodiments, the threshold distance may be up to 1,500 meters. In other embodiments, the threshold distance may be up to 100 meters.

With reference in particular to FIG. 5B, as described above, source device 152 may include a cloud computing device. As such, source device 152 may not be within the threshold distance of motor controller 56 but may wirelessly communicate with motor controller 56 via Wi-Fi router and modem 154, which may itself be within the threshold distance. Accordingly, source device 152 may be at a location remote from programming device 150 and/or motor controller 56. In FIG. 5B, programming device 150 initiates a wireless connection between motor controller 56 and source device 152. Source device 152 transmits the wireless control signal to motor controller 56 over a Wi-Fi connection (e.g., via Wi-Fi router and modem 154), for example, from a location remote from motor controller 56.

FIG. 5C illustrates an exemplary update process in which programming device 150 communicates with source device 152 over a cellular connection (e.g., via a cell tower 156), as opposed to a Wi-Fi connection. In such embodiments, source device 152 may be in a location remote from programming device 150, and programming device 150 may be within a cellular threshold distance (e.g., a signal range) of cell tower 156. Programming device 150 may also be within a threshold distance of motor controller 56 (which may be different from the cellular threshold distance).

FIG. 6 is a schematic diagram of an exemplary method of wirelessly reprogramming a plurality of motor controllers 56. In the exemplary embodiment, programming device 150 initiates a wireless connection with a plurality of motors 10 (e.g., with one or more components of motor controllers 56). Programming device 150 transmits the wireless control signal including the updated control parameters to each of the connected motors 10. Although only three motors 10 are illustrated, it should be readily understood that any number of motors 10 may be wirelessly connected to programming device 150 and may receive the wireless control signal therefrom. In some embodiments, as described above with respect to FIGS. 5A-5C, programming device 150 may receive the updated control parameters from a source device 152 via a Wi-Fi router and modem 154 and/or via a cell tower 156. Additionally or alternatively, as described above with respect to FIG. 5B, programming device 150 may initiate the wireless connection between motors 10 and source device 152, and source device 152 may transmit the updated control parameters to one or more of the connected motor(s) 10.

Figure 7:
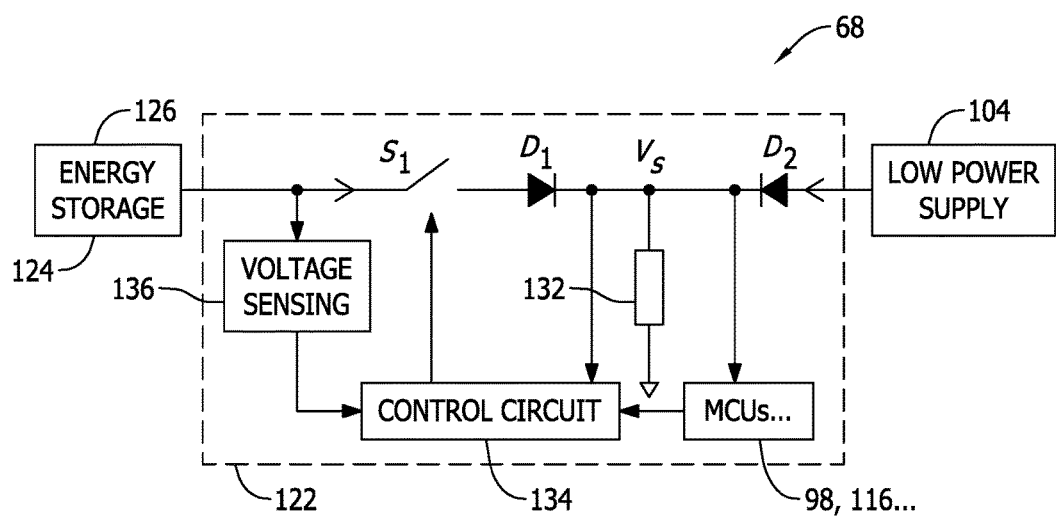
FIG. 7 is a schematic diagram of a first exemplary energy management system of the motor controller shown in FIG. 2.
Figure 8:
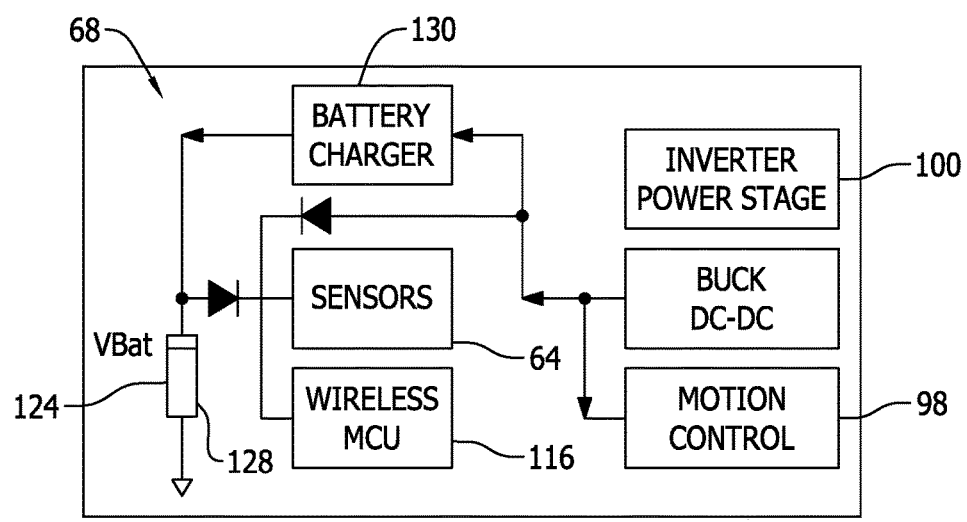
FIG. 8 is a schematic diagram of a second exemplary energy management system of the motor controller shown in FIG. 2.

Turning now to FIGS. 7 and 8, motor controller 56 includes energy management system 68. Energy management system 68 may be referred to as an "integral" energy management system including all elements necessary to power components of motor controller 56 are self-contained in motor controller 56, such that no connection to an external power source is necessary to power those components, as described herein. Energy management system 68 includes an energy management circuit 122 and an energy storage component 124 to power one or more components of motor controller 56 during a period of time before motor 10 is installed and connected to power source 90 (e.g., utility power). For example, energy management system 68 may power sensors 64, data management system 66, wireless MCU 116, wireless communication component 118, and/or motion control MCU 98 during the period of time. Moreover, energy management system 68 may power one or more components of motor controller 56 in different energy modes. For instance, a first energy mode many include a "sleep" mode, also referred to as a passive mode or a reduced-energy mode, under which the components are inactive or receiving a minimal amount of power. A second energy mode may include a "powered" mode, also referred to as an active mode or an elevated-energy mode, under which the components are activated and performing one or more functions.

Figure 9:
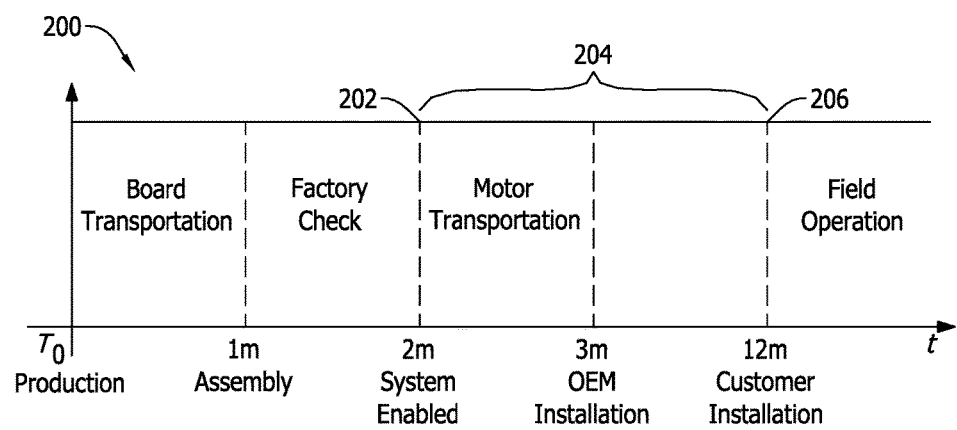
FIG. 9 depicts an exemplary timeline associated with operation of the motor controller illustrated in FIG. 2.

FIG. 9 illustrates an exemplary timeline 200 of a lifetime of motor 10, including motor controller 56, between production and field operation. At an activation time 202, energy management system 68 is enabled or activated and begins providing power to components of motor controller 56 in one or more energy modes, as described herein. In other words, activation time 202 refers to the activation of energy management system 68 and a beginning of a period of time 204 over which one or more components of motor controller 56 are receiving power from energy management system 68 (i.e., not from an external power source such as utility power). In some embodiments, at activation time 202, energy management system 68 begins to power sensors 64 to monitor the status of motor 10 and collect sensor data. In some embodiments, at activation time 202, energy management system 68 begins to power wireless MCU 116, wireless communication component 118, and/or motion control MCU 98 in a first energy mode. Activation may occur at a production facility (e.g., factory) of motor 10. Activation time 202 is illustrated as two months after production of motor 10 but is not limited thereto.

Energy management system 68 may be configured to adjust an amount of energy delivered to components of motor controller 56. For example, in some embodiments, energy management system 68 powers motion control MCU 98, wireless MCU 116, and/or wireless communication component 118 in a first or passive energy mode (e.g., a sleep mode). In response to programming device 150 initiating a wireless connection with motor controller 56, energy management system 68 powers motion control MCU 98, wireless MCU 116, and/or wireless communication component 118 in a second or active energy mode (e.g., a "powered" mode). Powering any component in the active or powered energy mode may cause that component to activate to perform one or more functions, as described herein. In addition, in some embodiments, energy management system 68 may re-power motion control MCU 98, wireless MCU 116, and/or wireless communication component 118 in the passive energy mode when one or more functions performed thereby are completed. For example, after motion control MCU 98 completes implementation of one or more updates, energy management system 68 may return the components to the passive or sleep mode, to conserve energy.

Energy management system 68 provides such power until an installation time 206, illustrated as twelve months after production of motor 10 but not limited thereto, at which motor 10 is installed and ready for use. More particularly, installation time 206 represents the time at which motor 10 is coupled to power source 90, which is then configured to power motor 10 for field use. In other words, installation time 206 refers to the time at which motor 10 is commissioned in the field for its ultimate use (e.g., within an HVAC system). In some cases, energy storage component 124 may deplete or run out of stored energy before installation time 206. In such cases, energy management system 68 may only function to provide power to components of motor controller 56 until energy storage component 124 is depleted. In other cases, energy storage component 124 may have additional energy remaining at installation time 206. In such cases, energy management system 68 may be configured to provide power to one or more components of motor controller 56 and/or motor 10 in the event that motor 10 is disconnected from power source 90.

Returning to FIGS. 7 and 8, energy storage component 124 may include any suitable energy storage element, such as a battery or a super capacitor. Energy storage component 124 is enabled at activation time 202 (shown in FIG. 9). Energy storage component 124 may be manually enabled by a technician or may be automatically enabled using an automated process. In FIG. 7, energy storage component 124 is embodied as a non-rechargeable battery 126 housed within motor management module 70 (e.g., soldered onto surface-mount pins on a board, such as an IMS board). Battery 126 may include, for example, a coin cell-type 3V battery. Battery 126 has a predefined lifetime, such as one year, two years, etc. In FIG. 8, energy storage component 124 is embodied as a rechargeable battery 128, and energy management system 68 further includes a battery charger 130 suitable for charging battery 128. In such cases, motor management module 70 and/or enclosure 54 may include a charging port (not shown) accessible to a user on the exterior of motor 10.

Energy management circuit 122, as illustrated in FIG. 7, includes a switch $S_1$ between battery 126 and a load 132 (e.g., sensors 64 and/or data management system 66), switch $S_1$ having reverse blocking capability. Switch $S_1$ may include a PNP BJT or P-channel MOSFET. Switch $S_1$ is in series with a blocking diode $D_1$ to prevent a charging current from low power supply 104. The effective voltage $V_S$ powers a control circuit 134, sensors 64, data management system 66, and/or additional loads. In addition, a voltage sensing circuit 136 monitors the terminal voltage of battery 126 and transmits this information to control circuit 134. Control circuit 134 monitors the lifetime of battery 126 according to the voltage. Another diode $D_2$ is used to reduce the load for battery 126 so that energy of battery 126 can be regulated efficiently.

Figure 10:
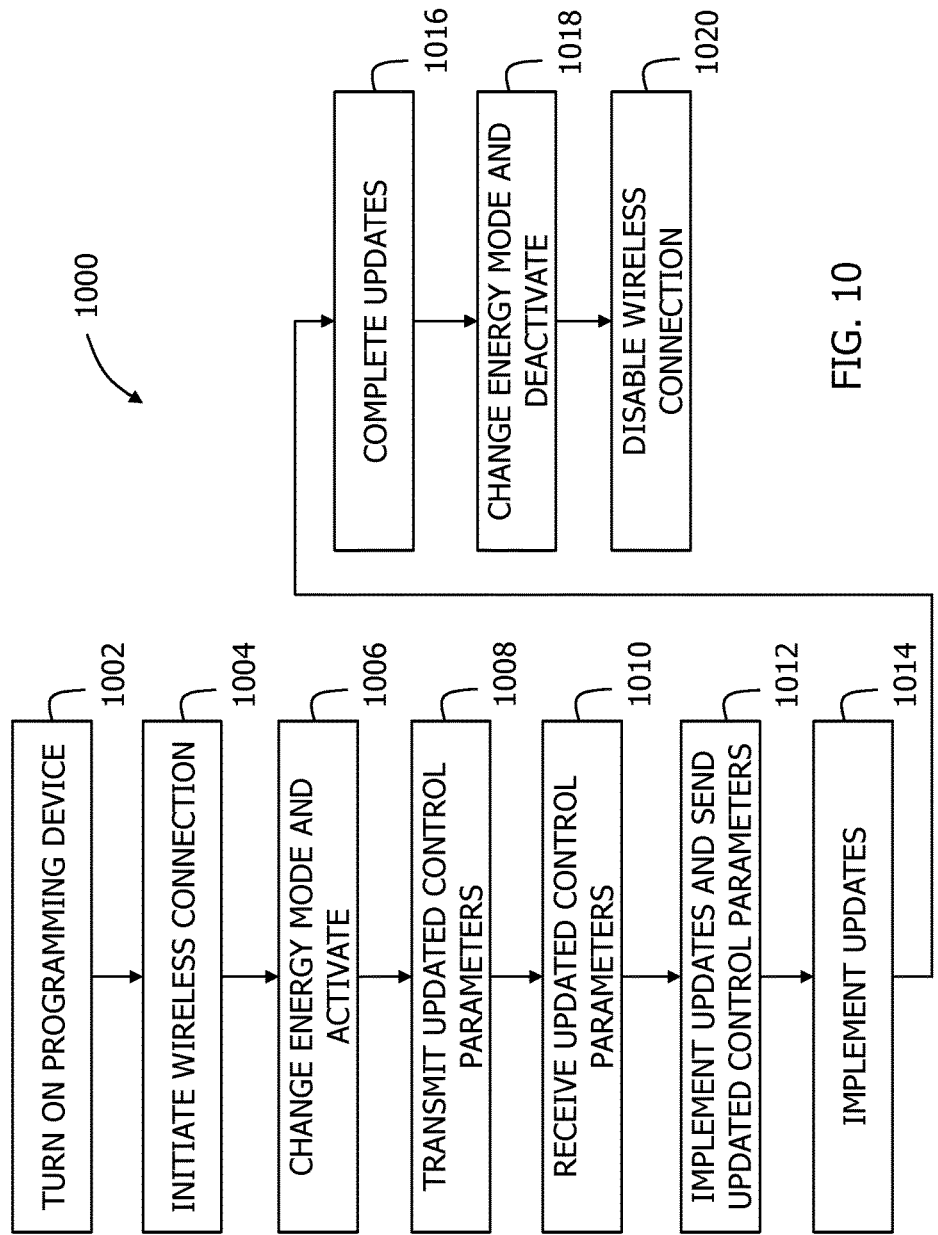
FIG. 10 is a flow diagram of an exemplary method of wirelessly reprogramming a motor controller.

FIG. 10 is a flow diagram of an exemplary method 1000 of wirelessly programming an electric motor (e.g., motor 10 shown in FIG. 1). Method 1000 is at least partially performed by a controller (e.g., motor controller 56 shown in FIG. 1) or components thereof, and at least partially performed by a remote device (e.g., remote device 121, shown in FIG. 4, programming device 150, and/or source device 152, both shown in FIGS. 5A-5C). In other embodiments, method 1000 may include additional, fewer, or alternative steps, including those described elsewhere herein.

In the illustrated embodiment, method 1000 includes step 1002, turning on or activating the remote device (specifically, a programming device). Step 1002 may be performed automatically (e.g., periodically, according to a schedule, in response to certain conditions, etc.) or manually (e.g., upon command by a user). Method 1000 includes step 1004, initiating a wireless connection. In some embodiments, step 1004 includes the programming device initiating a wireless connection with the motor. In other embodiments, step 1004 includes the programming device initiating a wireless connection between the motor and a source device.

In response to the initiation of the wireless connection, the motor performs a step 1006, changing an energy mode of and/or activating one or more components thereof. In one specific embodiment, in response to the initiation of the wireless connection, an energy management system of a motor controller (e.g., energy management system 68) powers one or more components of the motor controller in a powered energy mode, such that the one or more components are activated to perform one or more functions. In particular, the energy management system activates a wireless MCU (e.g., wireless MCU 116) and/or a wireless communication component (e.g., wireless communication component 118, both shown in FIG. 4), such that the wireless MCU and/or wireless communication component may receive wireless transmissions in a data transfer mode (e.g., the second or active mode).

In step 1008, the programming device transmits a wireless control signal including the updated control parameters to the motor. In an alternative embodiment, in step 1008, the source device transmits the updated control parameters to the motor. In step 1010, the wireless MCU and/or the wireless communication component receives the wireless control signal including the updated control parameters. In the illustrated embodiment, the wireless MCU processes the updated control parameters to identify updated control parameters directed to the wireless MCU. In step 1012, the wireless MCU implements updates to the wireless MCU (e.g., "self-implements" the updates) and transmits the updated control parameters to a motion control MCU (e.g., motion control MCU 98, shown in FIG. 4). Subsequently, the motion control MCU, in step 1014, implements one or more updates (e.g., to firmware and/or software of the motor) as directed by the updated control parameters.

The motion control MCU completes the one or more updates in step 1016, and, in response, the motor changes an energy mode and/or deactivates one or more components thereof, in step 1018. In one particular embodiment, in response to the motion control MCU completing the updates, the energy management system powers the components in a sleep mode or a reduced energy mode, and maintains those components in the sleep mode (e.g., until another wireless connection is initiated). In the example embodiment, method 1000 is performed when the motor is not connected to utility power or an external power source and, accordingly, the energy management system controls the energy delivered to the components of the motor. In an alternative embodiment, the wireless programming method 1000 may be performed when the motor is connected to utility power and, in such cases, the energy management system may not be needed to activate the components of the motor.

Method 1000 further includes step 1020, disabling the wireless connection. The energy management system may disable the wireless connection after returning the motor components into sleep mode. Alternatively, the programming device may receive one or more signals from the motor that the updates are complete, and the programming device may disable the wireless connections.

The methods and systems described herein may be implemented using computer programming or engineering techniques including computer software, firmware, hardware or any combination or subset thereof, wherein the technical effect may include at least one of: (a) providing an energy management system that enables powering components of a motor controller at various energy modes, when the motor is not connected to utility power; (b) facilitating wireless reprogramming of motors without having to connect the motors to utility power or to a reprogramming device; (c) enabling the simultaneous and parallel programming of a plurality of motors; and/or (d) reducing the time and effort required to reprogram one motor or a plurality of motors in parallel.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for controlling an electric motor, said motor controller comprising:
   a motion control microcontroller unit (MCU) for storing initial control parameters for said electric motor;
   a wireless receiver communicatively coupled to said motion control MCU, said wireless receiver configured to:
      activate in response to initiation of a wireless connection with a remote device;
      receive a wireless control signal from the remote device, the wireless control signal including updated control parameters, and
      transmit the updated control parameters to said motion control MCU; and
   an energy management system configured to, without connection of said motor controller to an external power source, power said wireless receiver and said motion control MCU.

2. The motor controller of claim 1, wherein said wireless receiver is further configured to:
   process the updated control parameters, and
   implement one or more updates associated with control of said wireless receiver based upon the updated control parameters.

3. The motor controller of claim 1, wherein said energy management system is further configured to:
   power said motion control MCU and said wireless receiver in a passive energy mode, and
   in response to the initiation of the wireless connection with the remote device, power said motion control MCU and said wireless receiver in an active energy mode, wherein powering said wireless receiver in the active energy mode causes said wireless receiver to activate.

4. The motor controller of claim 3, wherein said motion control MCU implements one or more updates to said motor controller based upon the updated control parameters when said motion control MCU is powered in the active energy mode.

5. The motor controller of claim 4, wherein said energy management system is further configured to re-power said motion control MCU and said wireless receiver in the passive energy mode after said motion control MCU implements the one or more updates.

6. A system for updating control parameters of electric motors, said system comprising:
   a programming device configured to:
      initiate a wireless connection with an electric motor; and
      transmit a wireless control signal to said electric motor, the wireless control signal including updated control parameters for control of said electric motor; and
   said electric motor comprising a motor controller for controlling said electric motor, said motor controller comprising:
      a motion control microcontroller unit (MCU) for storing initial control parameters for said electric motor;
      a wireless receiver communicatively coupled to said motion control MCU, said wireless receiver configured to:
         activate in response to the initiation of the wireless connection with said programming device;
         receive the wireless control signal from said programming device, and
         transmit the updated control parameters to said motion control MCU; and
      an energy management system configured to, without connection of the electric motor to an external power source, power said wireless receiver and said motion control MCU.

7. The system of claim 6 further comprising a plurality of electric motors including said electric motor, said programming device further configured to transmit the wireless control signal to each of said plurality of electric motors.

8. The system of claim 6, wherein said wireless receiver is further configured to:
   process the updated control parameters, and
   implement one or more updates associated with control of said wireless receiver based upon the updated control parameters.

9. The system of claim 6, wherein said energy management system is further configured to:
   power said motion control MCU and said wireless receiver in a passive energy mode, and
   in response to said programming device initiating the wireless connection with said motor controller, power said motion control MCU and said wireless receiver in an active energy mode, wherein powering said wireless receiver in the active energy mode causes said wireless receiver to activate.

10. The system of claim 9, wherein said motion control MCU implements one or more updates to said motor controller based upon the updated control parameters when said motion control MCU is powered in the active energy mode.

11. The system of claim 10, wherein said energy management system is further configured to re-power said motion control MCU and said wireless receiver in the passive energy mode after said motion control MCU implements the one or more updates.

12. The system of claim 10, wherein said programming device is configured to disable the wireless connection with the motor controller in response to said energy management system re-powering said motion control MCU and said wireless receiver in the passive energy mode.

13. The system of claim 6, wherein said programming device comprises a memory device, the updated control parameters stored in the memory device.

14. The system of claim 6, wherein said programming device is configured to receive the updated control parameters from a source device prior to transmitting the wireless control signal to said motor controller.

15. A method of wirelessly updating control parameters of electric motors, said method comprising:
   initiating, by a programming device, a wireless connection with an electric motor;
   in response to said initiating, activating a wireless receiver of the electric motor;
   transmitting, by the programming device, a wireless control signal to the electric motor, the wireless control signal including updated control parameters for control of the electric motor;
   receiving, at the wireless receiver, the wireless control signal;
   transmitting, by the wireless receiver, the updated control parameters to a motion control microcontroller unit (MCU) of the electric motor;
   implementing, by the motion control MCU, one or more updates associated with control of said wireless receiver based upon the updated control parameter; and
   powering, by an energy management system of the electric motor, without connection of said electric motor to an external power source, the wireless receiver and the motion control MCU.

16. The method of claim 15 wherein said activating comprises powering, by the energy management system of the electric motor, the wireless receiver and the motion control MCU in an active energy mode.

17. The method of claim 16 further comprising:
   completing, by the motion control MCU, the one or more updates; and
   in response to said completing, powering, by the energy management system, the wireless receiver and the motion control MCU in a passive energy mode.

18. The method of claim 17 further comprising disabling, by the programming device, the wireless connection.

19. The method of claim 15 further comprising receiving, by the programming device, the updated control parameters from a source device.

20. The method of claim 15 further comprising storing, by the programming device, the updated control parameters in a memory.

* * * * *